(12) United States Patent
Ma et al.

(10) Patent No.: US 11,799,739 B1
(45) Date of Patent: Oct. 24, 2023

(54) MATCHING OF VIRTUAL MACHINES TO PHYSICAL NODES FOR RESOURCE OPTIMIZATION

(71) Applicant: SAP SE, Walldorf (DE)

(72) Inventors: Yu Ma, Xi'an (CN); Jing He, Xi'an (CN); Haotian Zhou, Xi'an (CN); Xiaotao Wang, Xi'an (CN); Fu-qiang Lv, Xi'an (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/835,115

(22) Filed: Jun. 8, 2022

(51) Int. Cl.
| | |
|---|---|
| *H04L 41/40* | (2022.01) |
| *H04L 67/1001* | (2022.01) |
| *H04L 41/0806* | (2022.01) |
| *G06F 9/50* | (2006.01) |
| *G06F 9/455* | (2018.01) |

(52) U.S. Cl.
CPC .......... *H04L 41/40* (2022.05); *G06F 9/45558* (2013.01); *G06F 9/5077* (2013.01); *H04L 41/0806* (2013.01); *H04L 67/10015* (2022.05); *G06F 2009/4557* (2013.01); *G06F 2009/45595* (2013.01)

(58) Field of Classification Search
CPC ... G06F 2009/4557; G06F 2009/45595; H04L 41/0806; H04L 67/10015; H04L 41/40
See application file for complete search history.

(56) References Cited

U.S. PATENT DOCUMENTS

| | | | | |
|---|---|---|---|---|
| 9,378,044 B1 * | 6/2016 | Gaurav | .................. | G06F 9/5077 |
| 10,048,976 B2 * | 8/2018 | Ansari | .................. | G06F 9/5077 |
| 2013/0290536 A1 * | 10/2013 | Dutta | .................... | G06F 9/5027 |
| | | | | 709/226 |
| 2014/0229607 A1 * | 8/2014 | Jung | ....................... | H04L 43/08 |
| | | | | 709/224 |
| 2016/0216991 A1 * | 7/2016 | Ansari | ................... | G06F 9/5094 |
| 2017/0344394 A1 * | 11/2017 | Ansari | ............... | G06F 9/45558 |
| 2019/0220298 A1 * | 7/2019 | Jiao | ........................ | G06F 9/5077 |
| 2023/0058193 A1 * | 2/2023 | Mibu | .................. | G06F 9/45558 |

OTHER PUBLICATIONS

Anand et al., "Virtual Machine Placement optimization supporting performance SLAs", 2013 IEEE International Conference on Cloud Computing Technology and Science, Dec. 2013, IEEE Publishing.*
Dong et al., "Energy-Saving Virtual Machine Placement in Cloud Data Centers", May 2013, 13th IEEE/ACM International Symposium on Cluster, Cloud, and Grid Computing.*
U.S. Appl. No. 17/454,088, Lv et al., filed Nov. 9, 2021.

* cited by examiner

*Primary Examiner* — Todd L Barker
(74) *Attorney, Agent, or Firm* — Fish & Richardson P.C.

(57) ABSTRACT

Methods, systems, and computer-readable storage media for providing a VM vector representative of resources that are to be consumed by the VM within the cloud computing environment, comparing the VM vector to each physical node vector in a set of physical node vectors to determine a distance, each physical node vector representative of resources available by a respective physical node, and selecting a physical node from a set of physical nodes based on a respective distance between the VM vector and a physical node vector representative of the physical node, and in response, automatically: deploying the VM to the physical node within the cloud computing environment at least partially by installing the VM on the physical node for execution thereon.

20 Claims, 6 Drawing Sheets

MATCHING OF VIRTUAL MACHINES TO PHYSICAL NODES FOR RESOURCE OPTIMIZATION

BACKGROUND

Enterprises can use enterprise applications to support and execute operations. Enterprise applications can be deployed in cloud computing environments, which includes execution of the enterprise applications within a data center of a cloud-computing provider (e.g., as part of an infrastructure-as-a-service (IaaS) offering). Cloud computing can be described as Internet-based computing that provides shared computer processing resources, and data to computers and other devices on demand. Users can establish respective sessions, during which processing resources, and bandwidth are consumed. During a session, for example, a user is provided on-demand access to a shared pool of configurable computing resources (e.g., computer networks, servers, storage, applications, and services). The computing resources can be provisioned and released (e.g., scaled) to meet user demand.

SUMMARY

Implementations of the present disclosure are directed to a dynamic deployment system for virtual machines (VMs) in cloud computing environments. More particularly, implementations of the present disclosure are directed to vectorized correlation of VMs to physical nodes within cloud computing environments to select a physical node that a VM is deployed to.

In some implementations, actions include providing a VM vector representative of resources that are to be consumed by the VM within the cloud computing environment, comparing the VM vector to each physical node vector in a set of physical node vectors to determine a distance, each physical node vector representative of resources available by a respective physical node, and selecting a physical node from a set of physical nodes based on a respective distance between the VM vector and a physical node vector representative of the physical node, and in response, automatically: deploying the VM to the physical node within the cloud computing environment at least partially by installing the VM on the physical node for execution thereon. Other implementations of this aspect include corresponding systems, apparatus, and computer programs, configured to perform the actions of the methods, encoded on computer storage devices. Other implementations of this aspect include corresponding systems, apparatus, and computer programs, configured to perform the actions of the methods, encoded on computer storage devices.

These and other implementations can each optionally include one or more of the following features: the distance is determined based on a correlation coefficient that is calculated based on the VM vector and each physical node vector in the set of physical node vectors; the correlation coefficient is a Pearson correlation coefficient; comparing the VM vector to each physical node vector in the set of physical node vectors at least partially includes providing normalized VM vectors based on total resources vectors, each total resource vector representative of resources a respective physical node is capable of; comparing the VM vector to each physical node vector in the set of physical node vectors at least partially includes providing normalized physical node vectors based on total resources vectors, each total resources vector representative of resources a respective physical node is capable of; actions further include updating the physical node vector representative of the physical node in responsive to deployment of the VM to the physical node to account for resources consumed by the VM resulting from execution of the VM on the physical node; and the VM is provided as a computer-executable file and deploying the VM further includes transmitting the VM to the physical node for execution thereon.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

it is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DESCRIPTION

Figure 1:
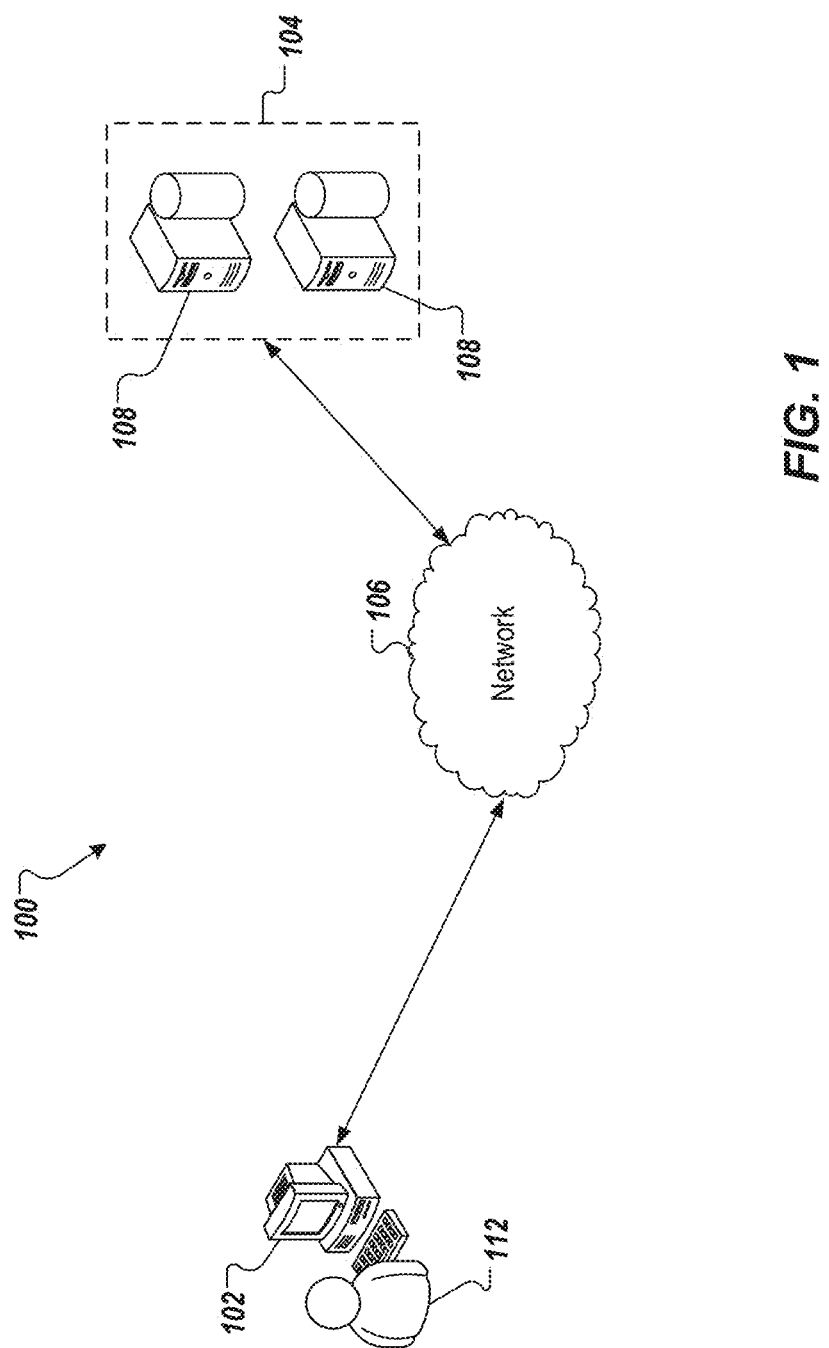
FIG. 1 depicts an example architecture that can be used to execute implementations of the present disclosure.

Implementations of the present disclosure are directed to a dynamic deployment system for virtual machines (VMs) in cloud computing environments. More particularly, implementations of the present disclosure are directed to vectorized correlation of VMs to physical nodes within cloud computing environments to select a physical node that a VM is deployed to. Implementations can include actions of providing a VM vector representative of resources that are to be consumed by the VM within the cloud computing environment, comparing the VM vector to each physical node vector in a set of physical node vectors to determine a distance, each physical node vector representative of resources available by a respective physical node, and selecting a physical node from a set of physical nodes based on a respective distance between the VM vector and a physical node vector representative of the physical node, and in response, automatically: deploying the VM to the physical node within the cloud. computing environment at least partially by installing the VM on the physical node for execution thereon.

To provide further context for implementations of the present disclosure, enterprises can use enterprise applications to support and execute operations. Enterprise applications can be deployed in cloud-computing environments, which includes execution of the enterprise applications within a data center of a cloud-computing provider (e.g., as part of an infrastructure-as-a-service (IaaS) offering). Cloud computing can be described as Internet-based computing that provides shared computer processing resources, and data to computers and other devices on demand. Users can establish respective sessions, during which processing resources, and bandwidth are consumed. During a session, for example, a user is provided on-demand access to a shared pool of configurable computing resources (e.g., computer networks, servers, storage, applications, and services). The computing resources can be provisioned and released (e.g., scaled) to meet user demand.

In general, scaling can include deploying or removing one or more VMs in a cloud computing environment. This can be part of what is referred to as elastic resource management. In some examples, a VM can be described as a virtual representation of a computing resource (e.g., a computer) and is provided as a computer-executable file, referred to as an image, that is executed to provide functions of a computing resource. For example, a VM can run in a window as a separate computing environment and can run an operating system that is different from the operating system of the computer that executes the VM. Further, a VM includes dedicated amounts of central processing units (CPUs) and memory, as well as networking and input/output (I/O) resources.

The VM is deployed to a physical node within a cloud computing environment, which provides the physical resources (e.g., CPUs, memory, network bandwidth, I/O rate) consumed by the VM. A physical node generally refers to a computing resource (e.g., computer, server) that is included in a network of computing resources within a cloud computing environment. In some examples, deploying of a VM to a physical node can be referred to as spin-up (e.g., spinning up a VM within a physical node), during which the VM is booted up on the physical node for execution.

Not all VMs are the same, however. For example, one VM can consume more CPU resources than another VM. As another example, one VM can consume more memory than another VM. Further, the number of resources available on physical nodes can vary. For example, one physical node can include a number of CPUs and an amount of memory that are different than another physical node. As another example, a physical node can be executing one or more VMs, which consume resources of the physical node. Consequently, the available resources of the physical node are less than if the physical node were executing fewer or no VMs.

In some approaches, static resource scheduling is adopted for deploying VMs to physical nodes of a cloud computing environment. In static resource scheduling, VMs are allocated to idle physical nodes for deployment in a cloud computing environment. In some examples, when a set of VMs is to be deployed, not all kinds of the resources can be fully used in the physical nodes. In other words, static resource scheduling results in inefficient and/or wasted use of physical resources on the physical nodes.

In further detail, and as noted above, the resources of VMs can include various types of resources, such as CPU, memory, network bandwidth, and I/O rate, as a few examples. If multiple computing-intensive (CPU-intensive) VMs are placed on the same physical node, CPU resources will be quickly exhausted, which can result in waste of other types of resources on the physical node. For example, if CPU is exhausted on a physical node, other resources (e.g., memory) might not be exhausted. However, because the physical node is exhausted in terms of CPU, the other available resources cannot be used.

In view of this, and as described in further detail herein, implementations of the present disclosure provide for dynamic deployment of VMs to physical nodes within a cloud computing environment. In accordance with implementations of the present disclosure, a physical node that is complementary to a VM is determined and the VM is deployed to that physical node. In this manner, all resources of a physical node are more effectively used than with prior deployment approaches. Accordingly, implementations of the present disclosure address issues in determining which physical node to deploy a VM to in an effort to reduce wasted resources in physical nodes.

FIG. 1 depicts an example architecture 100 in accordance with implementations of the present disclosure. In the depicted example, the example architecture 100 includes a client device 102, a network 110, and server systems 104, 106. The server systems 104, 106 each include one or more server devices and databases 108 (e.g., processors, memory). In the depicted example, a user 112 interacts with the client device 102.

In some examples, the client device 102 can communicate with the server system 104 and/or the server system 106 over the network 110. In some examples, the client device 102 includes any appropriate type of computing device such as a desktop computer, a laptop computer, a handheld computer, a tablet computer, a personal digital assistant (PDA), a cellular telephone, a network appliance; a camera, a smart phone, an enhanced general packet radio service (EGPRS) mobile phone, a media player, a navigation device, an email device, a game console, or an appropriate combination of any two or more of these devices or other data processing devices. In sonic implementations, the network 110 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each of the server systems 104, 106 includes at least one server and at least one data store. In the example of FIG. 1, the server systems 104, 106 are intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can provide a cloud computing environment to host one or more systems, such as a database system, that support operations of an enterprise. For example, the server system 104 provides computing resources as physical nodes in the cloud computing environment. One or more VMs can be deployed to physical nodes within the cloud computing environment to execute the one or more systems. In some implementations, and as described in further detail herein, a physical node that is complementary to a VM, in terms of resources, is determined, and the VM is deployed to the physical node.

In further detail, implementations of the present disclosure generate a vector that represents a resource state of an entity. In some examples, entities include a VM and a physical node. For example, a VM vector (V) is generated that represents a resource state of a respective VM in terms of resources required by the respective VM, and a physical node vector (P) is generated that represents a resource state of a respective physical node in terms of resources already consumed on the respective physical node. For example:

$$V_i = [CPU, MEM, NET, I/O]_i$$

where i indicates the $i^{th}$ VM in a set of m VMs, CPU indicates the amount of processing required, MEM indicates the amount of memory required, NET indicates the network bandwidth required, and I/O indicates the I/O rate required. In some examples, the values of the resources required by the respective VM are preset values that the VM is configured for. In some examples, the values of the resources required by the respective VM can be adjusted, for example, through a web portal. As another example:

$$P_j = [CPU, MEM, NET, I/O]_j$$

where j indicates the $j^{th}$ physical node in a set of n physical nodes, CPU indicates the amount of processing already consumed, MEM indicates the amount of memory already consumed, NET indicates the network bandwidth already consumed, and I/O indicates the I/O rate already consumed. In some examples, a monitoring service operates in the cloud computing environment and monitors load on physical nodes. The monitoring service can provide the values for CPU, MEM, NET, and I/O.

In some implementations, for each physical node, a total resource vector is provided. In some examples, a total resources vector (C) is generated that represents resources that the respective physical node is capable of providing. For example:

$$C_j = [CPU, MEM, NET, I/O]_j$$

where j indicates the $j^{th}$ physical node in the set of n physical nodes, CPU indicates the amount of processing that the $j^{th}$ physical node is capable of, MEM indicates the amount of memory that the $j^{th}$ physical node has, NET indicates the network bandwidth that the $j^{th}$ physical node is capable of, and I/O indicates the I/O rate that the $j^{th}$ physical node is capable of. In some examples, the values for the total resource vector are static values that are provided from a configuration file associated with the respective physical node.

In some implementations, the VM vector and the physical node vector are each normalized based on the total resources vector. For example:

$$V_i = \frac{V_i}{C_j} \quad P_j = \frac{P_j}{C_j}$$

In some examples, normalization is calculated by element-wise division. For example, CPU of $V_i$ is divided by CPU of $C_j$, and so on, and CPU of $P_j$ is divided by CPU of $C_j$, and so on. Through the normalization, each resource element (e.g., CPU, memory, network bandwidth, I/O rate) is mapped to an interval of [0, 1] that represents respective resource percentages.

In accordance with implementations of the present disclosure, a correlation methodology is applied to determine correlation between a VMs and physical nodes. In some implementations, the correlation methodology includes the Pearson correlation, which can be described as a measure of linear correlation between two sets of data. In the context of the present disclosure, the Pearson correlation represents a degree to which the physical node is complementary to the VM. The following example relationship is provided:

$$\rho_{V,P} = \frac{\sum_{q=1}^{t}(V_q - \overline{V})(P_q - \overline{P})}{\sqrt{\sum_{i=1}^{t}(V_q - \overline{V})^2} \sqrt{\sum_{i=1}^{t}(P_q - \overline{P})^2}}$$

where $\rho_{V,P}$ is a correlation coefficient that is determined across t pairs of VMs and physical nodes based on the respective normalized vectors, $\overline{V}$ is the mean value of all elements in a single vector V, and $\overline{P}$ is the mean value of all elements in a single vector P.

In some examples, a distance (d) between a VM and a physical node is determined. The following example relationship is provided:

$$d_{V,P} = \frac{1 + \rho_{V,P}}{2}$$

Because the correlation coefficient is of a range [−1, 1,] it can be provided that $d_{V,P}$ will be of the range [0, 1].

In some implementations, a distance (d) between a VM and each physical node in the set of physical nodes is respectively determined and one of the distances is identified as a minimum distance. The VM is deployed to the physical node associated with the minimum distance.

Figure 2:
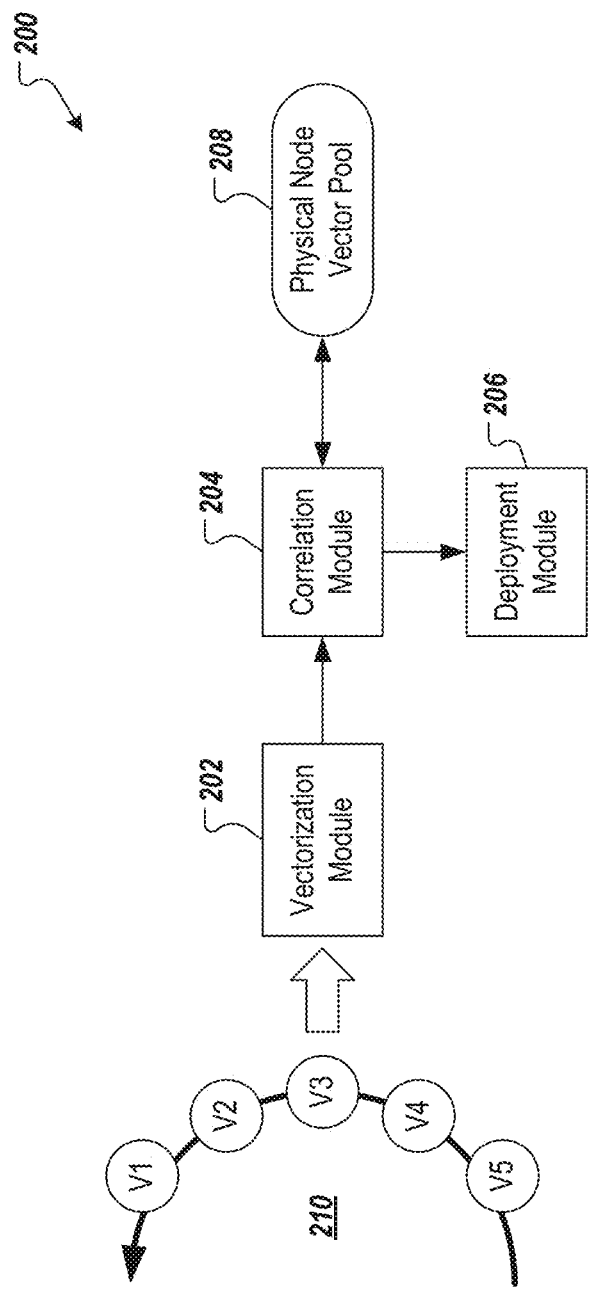
FIG. 2 depicts an example conceptual architecture for deployment of virtual machines (VMs) in accordance with implementations of the present disclosure.

FIG. 2 depicts an example conceptual architecture 200 for deployment of VMs in accordance with implementations of the present disclosure. In the depicted example, the conceptual architecture 200 includes a vectorization module 202, a correlation module 206, and a physical node vector pool 208. As described in further detail herein, the conceptual architecture 200 provides functionality for deploying one or more VMs in a set of VMs to one or more physical nodes in a set of physical nodes by determining, for each VM, a complementary physical node and deploying the VM to that physical node. In some examples, the set of VMs includes m VMs, where m≥1. In some examples, the set of physical nodes includes n physical nodes, where n≥2. In the example of FIG. 2, a set of VMs 210 is depicted for purposes of non-limiting illustration (e.g., m=5).

In some implementations, for each VM in the set of VMs 210, the vectorization module 202 provides a respective VM vector (V). The vectorization module 202 provides the VM vectors to the correlation module 204. In some examples, for each physical node in the set of physical nodes, a physical node vector (P) is retrieved by the correlation module 204 from the physical node vector pool 208. For each pair of VM vector and physical node vector (e.g., [$V_i$, $P_j$]), the correlation module 204 determines normalized vectors based on the total resources vector ($C_j$) of the respective physical node. The correlation module 204 determines a correlation coefficient ($\rho_{V,P}$) and a distance ($d_{V,P}$) for each pair of VM vector and physical node vector, as described herein.

In accordance with implementations of the present disclosure, the correlation module 204 selects a physical node, to which the VM is to be deployed to based on the distances. For example, the physical node having a distance that is a minimum to the VM is selected as the physical node to which the VM is to be deployed. In response, the correlation module 204 transmits instructions to the deployment module 206 to deploy the VM to the physical node. For example, the instructions can include a reference to the VM (e.g., an identifier that uniquely identifies the VM) and a reference to the physical node (e.g., an identifier that uniquely identifies the physical node). In response to the instructions, the deployment module 206 retrieves the VM (e.g., from a file repository) and transmits the VM to the physical node with instructions for the physical node to install and execute the VM thereon. In some examples, the physical node vector of the physical node is updated within the physical node vector pool 208 to reflect a change in available resources that accounts for the VM being deployed thereon.

In accordance with implementations of the present disclosure, the VM is automatically deployed to the physical node. In the context of the present disclosure, automatic deployment includes execution of one or more functions to deploy the VM to the physical node without human intervention. For example, the correlation module 204 automatically transmits instructions to the deployment module 206 to deploy the VM to the physical node without human intervention, and the deployment module 206 retrieves the VM and transmits the VM to the physical node with instructions for the physical node to install and execute the VM thereon without human intervention.

Figure 3A:
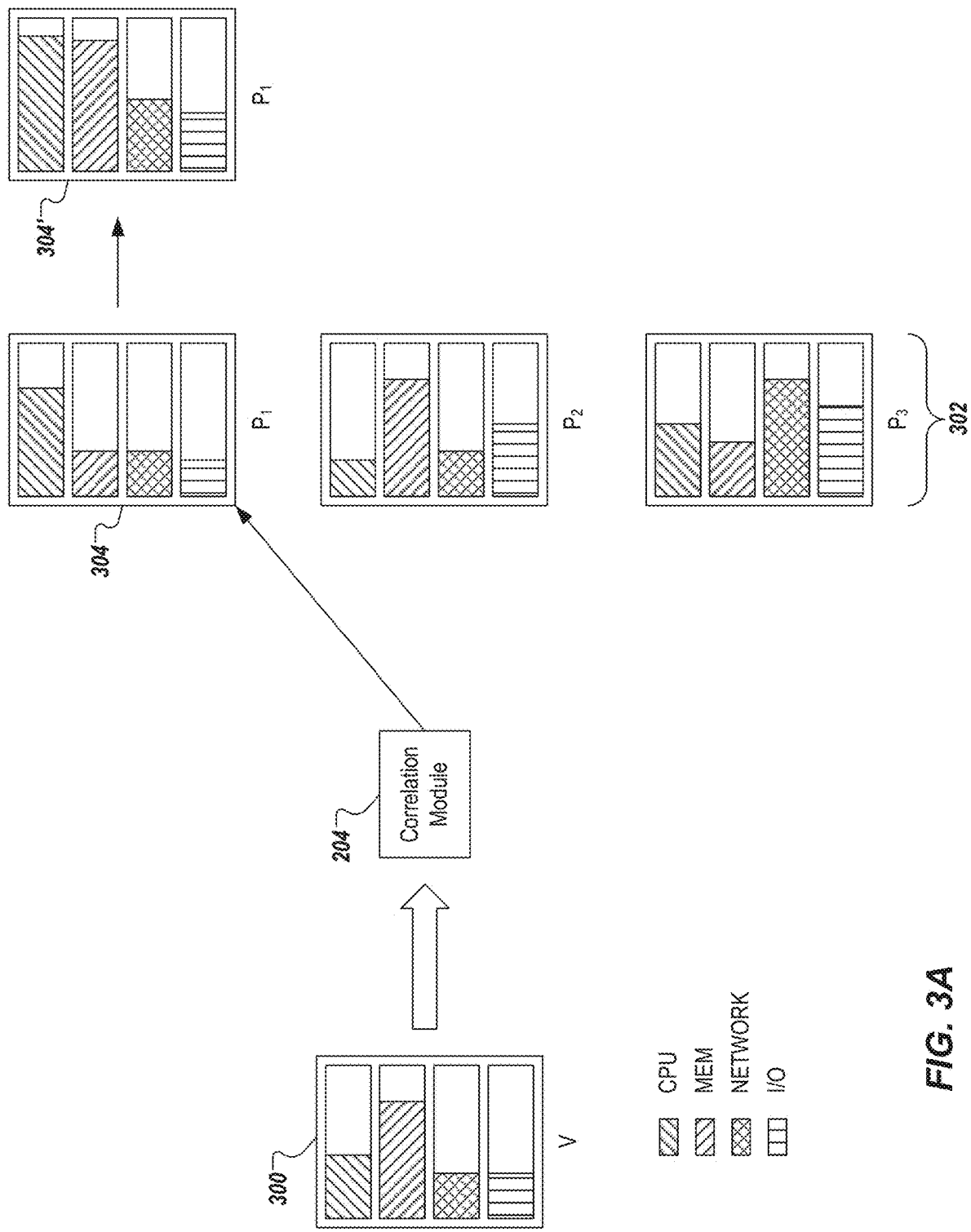
FIGS. 3A and 3B depict example selections of a physical node that a VM is deployed to in accordance with implementations of the present disclosure.
Figure 3B:
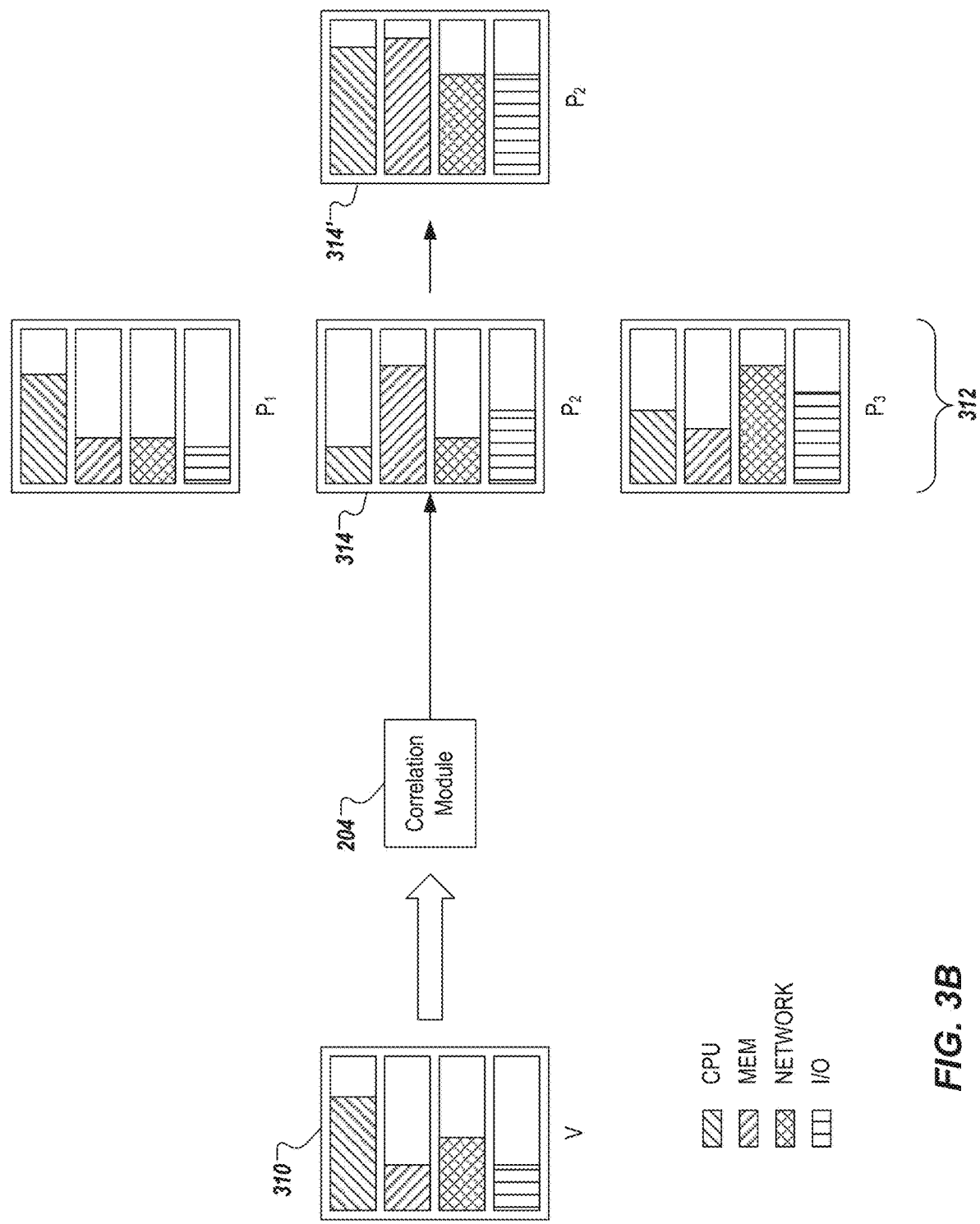

FIGS. 3A and 3B depict example selections of a physical node that a VM is deployed to in accordance with implementations of the present disclosure.

With particular reference to FIG. 3A, selection of a physical node based on a VM that is memory-intensive (relative to other resources consumed be the VM) is depicted. A VM vector 300 is provided (graphically depicted in FIG. 3A) to represent resources expected to be consumed by the VM. A correlation module, such as the correlation module 204 (discussed with reference to FIG. 2) determines a distance (d) between the VM and each physical node in a set of physical nodes 302.

For example, and as described herein, for each physical node in the set of physical nodes 302, a physical node vector (P) is retrieved by the correlation module 204 from the physical node vector pool. 208. For each pair of VM vector and physical node vector (e.g., [V, P$_1$], [V, P$_2$], [V, P$_3$]). the correlation module 204 determines normalized vectors based on the total resources vector (C$_j$) of the respective physical node. The correlation module 204 determines a correlation coefficient ($\rho_{V,P}$) and a distance (d$_{V,P}$) for each pair of VM vector and physical node vector, as described herein. In the example of FIG. 3A, the correlation module 204 identifies a first physical node associated with a first physical node vector 304 (graphically depicted in FIG. 3A) as having a minimum distance to the VM based on the VM vector 300. Consequently, the correlation module 204 can transmit instructions (e.g., to the deployment module 206) to deploy the VM to the first physical node. Further, the first physical node vector 304 is updated to provide a physical node vector 304' that accounts for deployment of the VM to the first physical node.

With particular reference to FIG. 3B, selection of a physical node based on a VM that is processor-intensive (relative to other resources consumed be the VM) is depicted. A VM vector 310 is provided (graphically depicted in FIG. 3B) to represent resources expected to be consumed by the VM. A correlation module, such as the correlation module 204 (discussed with reference to FIG. 2) determines a distance (d) between the VM and each physical node in a set of physical nodes 312.

For example, and as described herein, for each physical node in the set of physical nodes 312, a physical node vector (P) is retrieved by the correlation module 204 from the physical node vector pool 208. For each pair of VM vector and physical node vector (e.g., [V, P$_1$], [V, P$_2$], [V, P$_3$]), the correlation module 204 determines normalized vectors based on the total resources vector (C$_j$) of the respective physical node. The correlation module 204 determines a correlation coefficient ($\rho_{V,P}$) and a distance ((d$_{V,P}$) for each pair of VM vector and physical node vector, as described herein. In the example of FIG. 3B, the correlation module 204 identifies a second physical node associated with a second physical node vector 314 (graphically depicted in FIG. 3B) as having a minimum distance to the VM based on the VM vector 310. Consequently, the correlation module 204 can transmit instructions (e.g., to the deployment module 206) to deploy the VM to the second physical node, Further, the second physical node vector 314 is updated to provide a physical node vector 314' that accounts for deployment of the VM to the second physical node.

Figure 4:
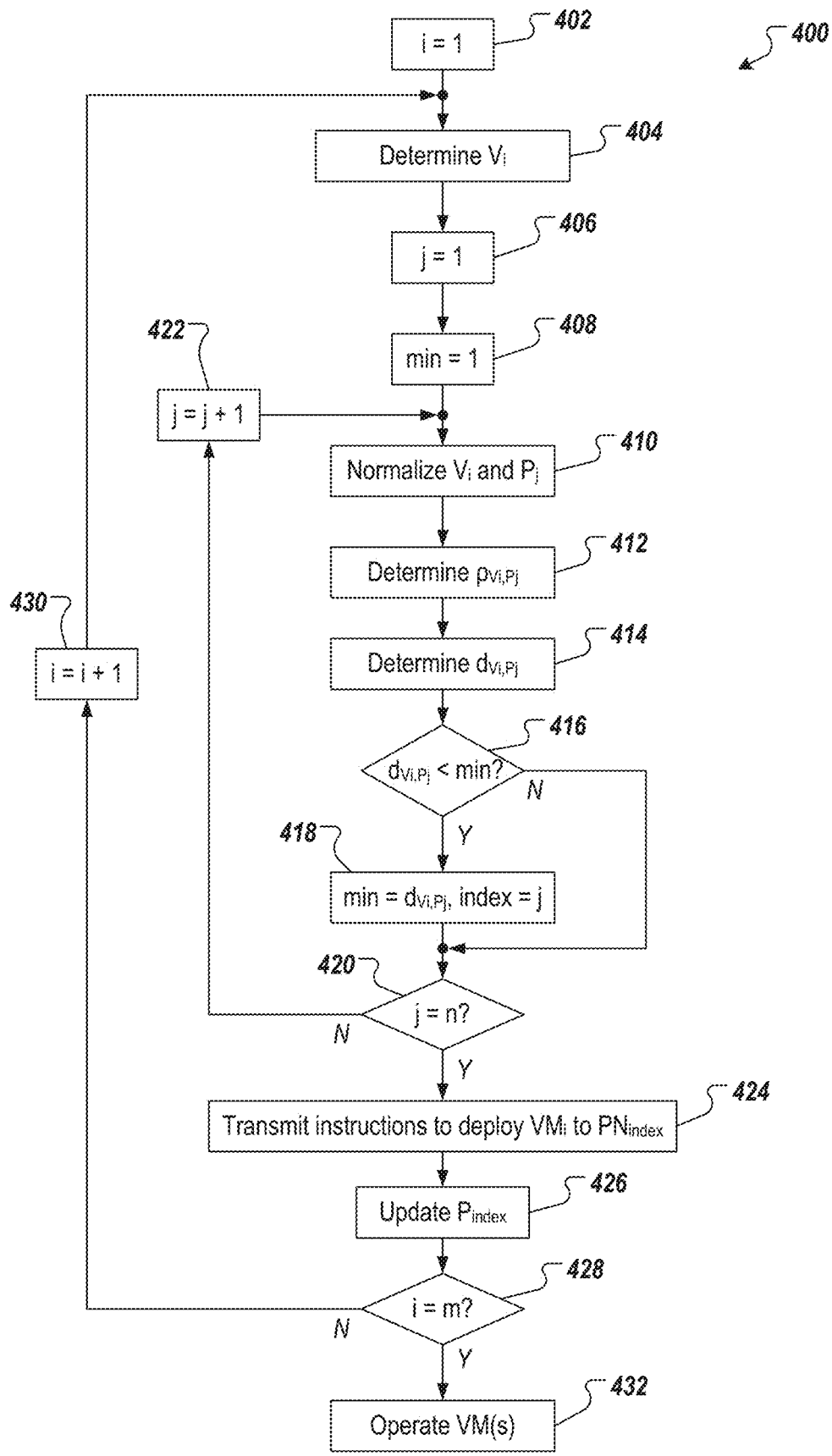
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices. In the example of FIG. 4, each VM in a set of m VMs is to be deployed to a physical node in a set of n physical nodes, where m≥1 and n≥2.

A counter i is set equal to 1 (402). A VM vector V$_i$ is determined (404). For example, and as described herein, the VM vector V$_i$ represents a resource state of the i$^{th}$ VM in the set of m VMs in terms of resources required by the i$^{th}$ VM (e.g., V$_i$=[CPU, MEM, NET, I/O]$_i$). A counter j is set equal to 1 (406) and a minimum (min) is set equal to 1 (408).

The VM vector V$_i$ and a physical node vector P$_j$ normalized (410). For example, and as described herein, the physical node vector P$_j$ represents a resource state of the j$^{th}$ physical node in the set of n physical nodes in terms of resources already consumed on the j$^{th}$ physical node. In some examples, the VM vector V$_i$ and the physical node vector P$_j$ are each normalized based on a total resources vector C$_j$ of the j$^{th}$ physical node (C$_j$=[CPU, MEM, NET, I/O]$_j$). For example:

$$V_i = \frac{V_i}{C_j} \quad P_j = \frac{P_j}{C_j}$$

A correlation coefficient $\rho_{V_i,P_j}$ and a distance d$_{V_i,P_j}$ are determined for the (normalized) VM vector V$_i$ and the (normalized) physical node vector P$_j$ (412, 414). It is determined whether the distance d$_{V_i,P_j}$ is less than the minimum (416). If the distance d$_{V_i,P_j}$ is less than the minimum, the minimum is set equal to the distance d$_{V_i,P_j}$ and an index is set equal to j (418). It is determined whether j is equal to n (420). That is, it is determined whether the i$^{th}$ VM in the set of m VMs has been compared to each physical node in the set of n physical nodes. If j is not equal to n, j is incremented (422) and the example process 400 loops back.

If j is equal to n, instructions are transmitted to deploy the i$^{th}$ VM in the set of m VMs to the physical node indicated by the index (e.g., $PN_{index}$) (424). For example, and as described herein, instructions are automatically transmitted to the physical node and can include a reference to the VM (e.g., an identifier that uniquely identifies the VM) and a reference to the physical node (e.g., an identifier that uniquely identifies the physical node) and are executed to retrieve the VM (e.g., from a file repository) and transmits the VM to the physical node for the physical node to install and execute the VM thereon. The physical node vector representative of the physical node indicated by the index is updated (426). For example, and as described herein, the physical node vector is updated to account for resources consumed by deployment of the $i^{th}$ VM to the physical node indicated by the index.

It is determined whether i is equal to m (428). That is, it is determined whether all VMs in the set of m VMs have been deployed to physical node in the set of n physical nodes. If i is not equal to m, j is incremented (430) and the example process 400 loops back. If i is equal to m, the VM(s) in the set of m VMs is/are operated in the cloud computing environment (432).

Figure 5:
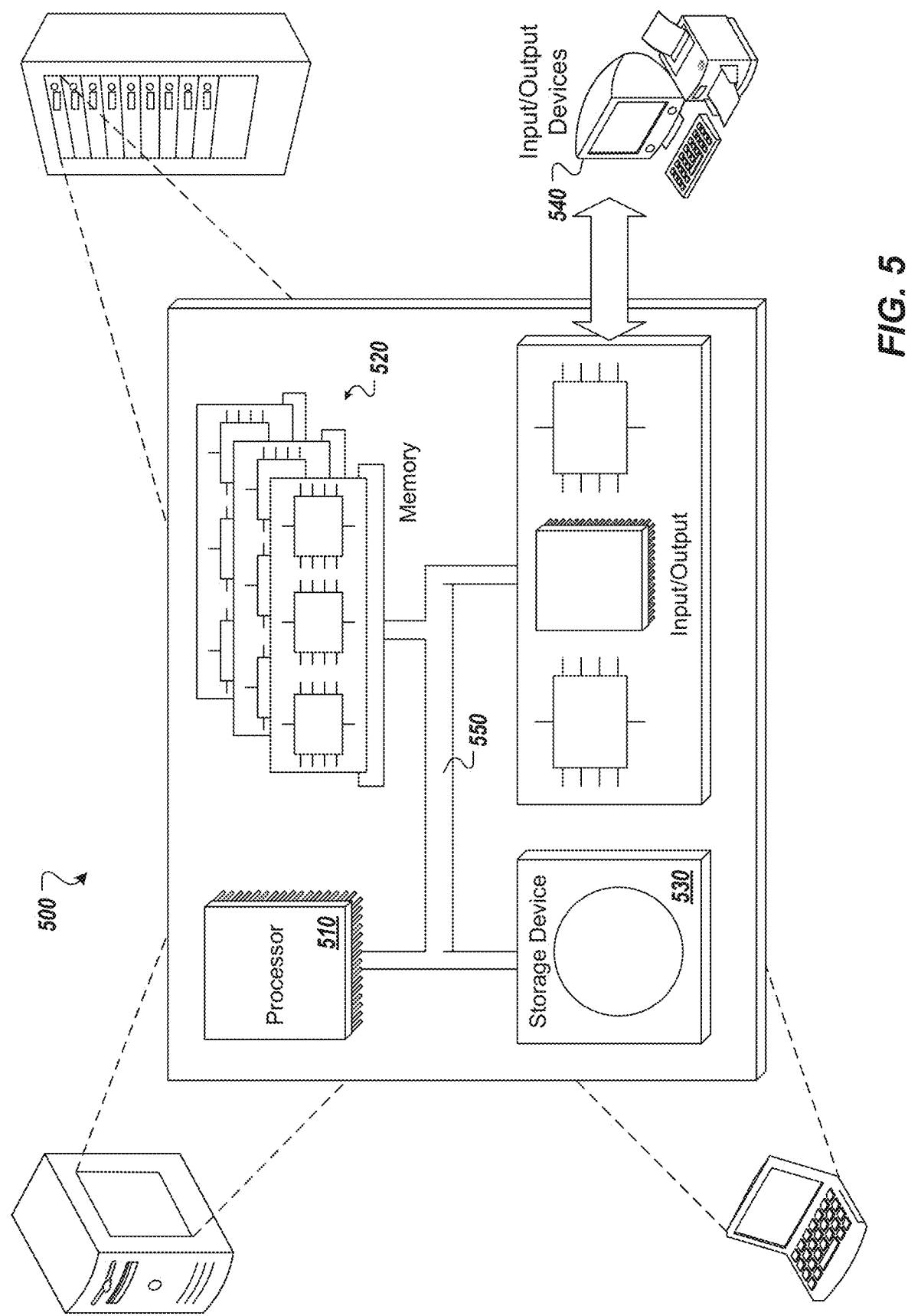
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory' devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for deploying virtual machines (VMs) within a cloud computing environment, the method being executed by one or more processors and comprising:
providing a VM vector representative of resources that are to be consumed by the VM within the cloud computing environment;
providing a set of physical node vectors, each physical node vector representative of resources available by a respective physical node;
comparing the VM vector to each physical node vector in the set of physical node vectors to provide a set of distances at least partially by:
setting a minimum value,
determining a distance between the VM vector and a physical node vector, and
determining that the distance is less than the minimum value, and in response:
updating the minimum value to be equal to the distance; and
selecting a physical node from a set of physical nodes based on a respective distance between the VM vector and a physical node vector representative of the physical node, and in response, automatically:
deploying the VM to the physical node within the cloud computing environment at least partially by installing the VM on the physical node for execution thereon.

2. The method of claim 1, wherein the distance is determined based on a correlation coefficient that is calculated based on the VM vector and each physical node vector in the set of physical node vectors.

3. The method of claim 2, wherein the correlation coefficient comprises a Pearson correlation coefficient.

4. The method of claim 1, wherein comparing the VM vector to each physical node vector in the set of physical node vectors at least partially comprises providing normalized VM vectors based on total resources vectors, each total resource vector representative of resources a respective physical node is capable of.

5. The method of claim 1, wherein comparing the VM vector to each physical node vector in the set of physical node vectors at least partially comprises providing normalized physical node vectors based on total resources vectors, each total resources vector representative of resources a respective physical node is capable of.

6. The method of claim 1, further comprising updating the physical node vector representative of the physical node in response to deployment of the VM to the physical node to account for resources consumed by the VM resulting from execution of the VM on the physical node.

7. The method of claim 1, wherein the VM is provided as a computer-executable file and deploying the VM further comprises transmitting the VM to the physical node for execution thereon.

8. A non-transitory computer-readable storage medium coupled to one or more processors and having instructions stored thereon which, when executed by the one or more processors, cause the one or more processors to perform operations for deploying virtual machines (VMs) within a cloud computing environment, the operations comprising:
providing a VM vector representative of resources that are to be consumed by the VM within the cloud computing environment;
providing a set of physical node vectors, each physical node vector representative of resources available by a respective physical node;
comparing the VM vector to each physical node vector in the set of physical node vectors to provide a set of distances at least partially by:
setting a minimum value,
determining a distance between the VM vector and a physical node vector, and
determining that the distance is less than the minimum value, and in response:
updating the minimum value to be equal to the distance; and
selecting a physical node from a set of physical nodes based on a respective distance between the VM vector and a physical node vector representative of the physical node, and in response, automatically:
deploying the VM to the physical node within the cloud computing environment at least partially by installing the VM on the physical node for execution thereon.

9. The non-transitory computer-readable storage medium of claim 8, wherein the distance is determined based on a correlation coefficient that is calculated based on the VM vector and each physical node vector in the set of physical node vectors.

10. The non-transitory computer-readable storage medium of claim 9, wherein the correlation coefficient comprises a Pearson correlation coefficient.

11. The non-transitory computer-readable storage medium of claim 8, wherein comparing the VM vector to each physical node vector in the set of physical node vectors at least partially comprises providing normalized VM vectors based on total resources vectors, each total resource vector representative of resources a respective physical node is capable of.

12. The non-transitory computer-readable storage medium of claim 8, wherein comparing the VM vector to each physical node vector in the set of physical node vectors at least partially comprises providing normalized physical node vectors based on total resources vectors, each total resources vector representative of resources a respective physical node is capable of.

13. The non-transitory computer-readable storage medium of claim 8, wherein operations further comprise updating the physical node vector representative of the physical node in response to deployment of the VM to the physical node to account for resources consumed by the VM resulting from execution of the VM on the physical node.

14. The non-transitory computer-readable storage medium of claim 8, wherein the VM is provided as a computer-executable file and deploying the VM further comprises transmitting the VM to the physical node for execution thereon.

15. A system, comprising:
a computing device; and
a computer-readable storage device coupled to the computing device and having instructions stored thereon which, when executed by the computing device, cause the computing device to perform operations for deploying virtual machines (VMs) within a cloud computing environment, the operations comprising:

providing a VM vector representative of resources that are to be consumed by the VM within the cloud computing environment;

providing a set of physical node vectors, each physical node vector representative of resources available by a respective physical node;

comparing the VM vector to each physical node vector in the set of physical node vectors to provide a set of distances at least partially by:

setting a minimum value, determining a distance between the VM vector and a physical node vector, and determining that the distance is less than the minimum value, and in response:

updating the minimum value to be equal to the distance; and selecting a physical node from a set of physical nodes based on a respective distance between the VM vector and a physical node vector representative of the physical node, and in response, automatically:

deploying the VM to the physical node within the cloud computing environment at least partially by installing the VM on the physical node for execution thereon.

16. The system of claim 15, wherein the distance is determined based on a correlation coefficient that is calculated based on the VM vector and each physical node vector in the set of physical node vectors.

17. The system of claim 16, wherein the correlation coefficient comprises a Pearson correlation coefficient.

18. The system of claim 15, wherein comparing the VM vector to each physical node vector in the set of physical node vectors at least partially comprises providing normalized VM vectors based on total resources vectors, each total resource vector representative of resources a respective physical node is capable of.

19. The system of claim 15, wherein comparing the VM vector to each physical node vector in the set of physical node vectors at least partially comprises providing normalized physical node vectors based on total resources vectors, each total resources vector representative of resources a respective physical node is capable of.

20. The system of claim 15, wherein operations further comprise updating the physical node vector representative of the physical node in response to deployment of the VM to the physical node to account for resources consumed by the VM resulting from execution of the VM on the physical node.

* * * * *